(12) United States Patent
Levin

(10) Patent No.: US 9,212,969 B2
(45) Date of Patent: Dec. 15, 2015

(54) OPTICAL TIME DOMAIN REFLECTOMETER USER INTERFACE

(76) Inventor: Piotr Anatolij Levin, Vilnius (LT)

( * ) Notice: Subject to any disclaimer, the term of this patent is extended or adjusted under 35 U.S.C. 154(b) by 876 days.

(21) Appl. No.: 13/022,225

(22) Filed: Feb. 7, 2011

(65) Prior Publication Data

US 2012/0200846 A1   Aug. 9, 2012

(51) Int. Cl.
*G01M 11/00* (2006.01)
*H04B 10/071* (2013.01)

(52) U.S. Cl.
CPC ......... *G01M 11/3145* (2013.01); *H04B 10/071* (2013.01)

(58) Field of Classification Search
CPC .. H04N 7/26053; H04N 7/30; G06F 3/04847; G01M 11/3109; G01M 11/3127
USPC ....................................................... 715/810
See application file for complete search history.

(56) References Cited

U.S. PATENT DOCUMENTS

2003/0039408 A1\*   2/2003   Smith ........................... 382/298

OTHER PUBLICATIONS

Agilent Technologies, E6000C Mini-OTDR User's Guide, 2000, 2001, pp. 1,2,43,46,48,50,51,53,55,68,87,90,92-95,107-128,153,154,157,161-163,222-230,237.\*

\* cited by examiner

*Primary Examiner* — Jennifer To
*Assistant Examiner* — Terri Filosi
(74) *Attorney, Agent, or Firm* — Michael J Persson; Catherine E Napjus; Lawson Persson Weldon-Francke

(57) ABSTRACT

An OTDR user interface including a setup menu that includes a plurality of user settings capable of displaying information corresponding to a test, wherein each of the plurality of user settings is capable of displaying information corresponding to a different aspect of the test, and wherein one of the plurality of user settings is a dynamic range setting capable of displaying a dynamic range of the test.

11 Claims, 8 Drawing Sheets

FIG. 2A
PRIOR ART

| Setup Mode | Full Auto ▽ | Set by the user |
| --- | --- | --- |
| Wavelength | 1310 + 1550 + 1625 nm | |
| Distance Range | Automatic | Set by the OTDR |
| Test Duration | Automatic | |
| Pulse Width | Automatic | |

FIG. 2B
PRIOR ART

| Setup Mode | Expert ▽ | |
| --- | --- | --- |
| Wavelength | 1310 + 1550 nm ▽ | |
| Distance Range | 5 km ▽ | Set by the user |
| Test Duration | 10 seconds ▽ | |
| Pulse Width | 30 ns ▽ | |

OPTICAL TIME DOMAIN REFLECTOMETER USER INTERFACE

FIELD OF THE INVENTION

The present invention relates to optical time-domain reflectometers (OTDRs), and in particular, to an OTDR user interface that more clearly communicates the changes to the measurement performance of an OTDR that result from changes to certain input parameters.

BACKGROUND

An optical time-domain reflectometer (OTDR) is a useful tool for testing point-to-point fiber optic links, testing passive optical networks (PONs), and finding faults, such as breaks and measure reflectance or optical return loss (ORL) in fiber optic networks. As shown in FIG. 1 a typical OTDR includes one or more processors, which include necessary CPU, memory, software and other components. These processors are in communication with a user interface made up of a display and controls, such as buttons, knobs, touch screens or the like, an output pulse generator and laser driver, a sampling analog to digital converter and a photo detector with input amplifier. The output pulse generator and laser driver drives the laser or lasers, which send light pulses through a coupler and into an optical fiber network under test.

The OTDR generates output pulses and measures the return signal from the same end of the fiber network under test. The return optical signal from each pulse (optical fiber backscatter and event reflections) is converted into an analog electrical signal that must be amplified. The OTDR input amplifier has a finite gain-bandwidth product, which is a key reason why real OTDR event resolution is longer than would be indicated by the nominal pulse width in nanoseconds divided by 10 equals trace event width in meters. The amplified electrical signal is sampled and converted into digital data points, which are averaged over many pulses (determined by test duration) and digitally filtered if needed to decrease noise, and thus increase dynamic range, at the expense of resolution. The product is a trace.

OTDRs typically include a number of user settings, including setup mode, wavelength, distance range, pulse width, and test duration. The setup mode setting allows the user to configure the OTDR for automatic mode, manual or expert mode, or, in some models, application-specific operations. The wavelength setting determines which lasers (wavelengths) are used to measure the fiber network under test. The distance range setting determines the section (length) of the fiber network under test that will be included in the OTDR trace. The pulse width setting determines test pulse duration, typically set in nanoseconds or microseconds, and typically also determines other key OTDR parameters such as amplifier bandwidth and digital or analog filter settings. The test duration setting determines the nominal duration of the test, typically set in seconds or minutes, which in turn determines the number of samples averaged to create each trace data point.

In the automatic mode, most settings are selected automatically by the OTDR. This is useful for inexperienced users, or experienced users who need to create a baseline trace quickly, but will result in an OTDR setup that is not optimized for most applications. FIG. 2A shows typical OTDR user settings in automatic mode. In the expert mode, most or all settings are selected by the user. FIG. 2B shows typical user settings in expert mode. Additional setting choices offered in the expert mode will allow experienced users to optimize the performance of their OTDR for specific applications, such as detecting and/or resolving closely spaced events or measuring the loss of a splice near the far end of the fiber network under test.

OTDR dynamic range is a key performance parameter. OTDR dynamic range is a function of pulse width, test duration, and OTDR signal processing parameters typically automatically selected by the OTDR based on pulse width, such as input amplifier and filter (analog, digital or both) bandwidth. Therefore, in the expert mode of a current art OTDR, the user determines dynamic range by selecting pulse width and test duration. For a given choice of distance range and wavelength, each pulse width/test duration combination corresponds with a given OTDR dynamic range. The higher the dynamic range, the smoother the OTDR trace, and therefore the better the loss measurement accuracy, which is needed to detect and measure low loss events, such as splices. The user can increase dynamic range by increasing pulse width, which coarsens event resolution, or increasing test duration, or both. Therefore, OTDR setup involves a tradeoff between dynamic range, event resolution, and test duration, but only test duration is a parameter available for viewing and adjustment on current art OTDRs.

The tradeoff between dynamic range and event resolution is explained with reference to FIGS. 3A-3C. FIG. 3A shows an exemplary fiber network 70 being tested by an OTDR 72. The network includes an input connection 73, two connections 74, 75, a splice 76 and a network termination 77. FIG. 3B shows a trace 80 produced by the OTDR when a fine event resolution is chosen by the user. This trace 80 allows the user to clearly differentiate between the two connections, shown in FIG. 3B as events 81, 82, but user cannot accurately measure the loss of the splice, which is a low loss event. FIG. 3C shows a trace 90 produced by the OTDR when a high dynamic range setup is chosen by the user. This trace 90 allows the user to accurately measure the loss of the splice, which is the downward sloping region 91 on the trace. However, the two connections are shown on the trace as a single event 92 rather than two separate events.

Pulse width is not the same as event resolution. The idealized relationship between OTDR trace event width in units of distance (d) and output pulse width in units of time (t) is $d=ct/2n$, where $c$=the speed of light in a vacuum and $n$ is the fiber group index of refraction at the trace wavelength. This relationship is often approximated as $d\ (m)=t\ (ns)/10$, as discussed above. Common measures of event resolution, such as attenuation dead zone, are normally longer than the idealized trace event width because they include the effects of output pulse shape, input amplifier bandwidth, filtering (analog, digital, or both) and other OTDR characteristics. Therefore pulse width is not the most precise metric for representing event resolution.

Therefore there is a need for an OTDR that provides for the display and adjustment of dynamic range and a measure of event resolution in its users settings, that shows dynamic range in setup menus and ties this value to the current pulse width and test duration settings, that allow the user to change dynamic range directly and tie this new setting to event resolution and test duration, and that also allow the user to 'lock' any one of these settings, the one most important to the user in the given application, and then make trade-offs between the other two.

SUMMARY OF THE INVENTION

The present invention is an OTDR having an improved user interface, a software product for controlling the operation of the improved user interface, and a method of interfacing with an OTDR.

In its most basic form the OTDR of the present invention includes a user interface with a setup menu that includes a plurality of user settings, one of which is a setting that displays the dynamic range of a test.

It is preferred that the setup menu also include event resolution and test duration settings and that all three settings; dynamic range, event resolution, and test duration, be capable of receiving input from a user. Moreover, it is preferred that, when input is provided to one of the settings, the other settings adjust to show the effect of the input on the other parameters. It is also preferred that each of the dynamic range, event resolution, and test duration settings include a lock setting where a user can lock a value or range into one of the settings. Typically, the user will lock in the most important setting for his given application, and then make tradeoffs between the other two. For example, the user may lock in an event resolution and then choose a tradeoff between test duration and dynamic range, or the user may lock in a test duration, and then choose a tradeoff between the event resolution and the dynamic range.

It is also preferred that the settings be displayed in the setup menu using graphical controls, such as a slide switch. Such a graphical control presents the parameters as a range of possible values and the user may select different values by moving the control through the range, for example by sliding a slide switch from one position to another. When graphical controls are included and a setting has been locked, it is preferred that any limits imposed on the non-locked settings by the value or range locked into the locked setting be displayed on those non-locked settings. An example of such a display of a limit might be a block over a certain part of a range of a non-locked setting. For example, if event resolution is locked at a certain value, sections of the dynamic range control may no longer be available as an option for the user and would be blocked off so that that user could not slide a slide switch into the blocked sections.

In addition to the dynamic range, event resolution, and test duration settings, it is understood that the preferred user interface of the OTDR of the present invention also includes the standard settings for mode, wavelength, and distance range. The mode setting includes an option for an expert mode so that the user may take advantage of the options for setting input that are available with the improved user interface.

The event resolution setting may be for any metric for event resolution, such as pulse width, attenuation dead zone, and event dead zone. Pulse width is not preferred for the reasons discussed in the background, but may be included in some non-preferred embodiments of the present invention. However, it is preferred that an attenuation dead zone setting be one of the possible event resolution settings. Each event resolution/test duration pair for a given distance range and wavelength is associated with a given dynamic range. For a given wavelength, distance range, and test duration, the key performance tradeoff the user must make is between dynamic range and event resolution. For example, a user may select a fine resolution that will allow the OTDR to detect closely spaced events, but may not allow the OTDR to accurately measure low loss events, such as splices. On the other hand, a user may select a high dynamic range needed for measuring splice loss, but the resulting course event resolution may not be sufficient for separately detecting closely spaced events. In addition, test duration may be increased to improve dynamic range at a given event resolution or to improve event resolution for a given dynamic range.

These examples illustrate the balance that must be made between the dynamic range, event resolution, and test duration parameters. A skilled user must carefully tailor the balance for the specific requirements of the test, including the characteristics of the fiber network under test, the equipment being used for the test, and the goals of the test. With current art OTDR user interfaces, the dynamic range is not even displayed, let alone provided as a setting that may receive user input, and event resolution is generally displayed non-precisely as pulse width. However, with the OTDR of the present invention, which includes the improved user interface, the skilled user has all three settings available to allow him to appropriately balance the test parameters.

In its most basic form, the software product for controlling the operation of the improved user interface includes a setup menu code, which includes a plurality of sets of user setting code, including dynamic range setting code and dynamic range display code. The software product of the present invention is intended for use with a OTDR, which includes memory and control circuitry. In such embodiments, the software product is stored in the memory and executable by the control circuitry of the OTDR device. However, the software product may also be adapted for use in connection with OTDRs that are controlled by personal computers or other types of controllers, in which case the software product is stored in the memory of the controller and is executable by its microprocessor.

The setup menu code provides for a setup menu in the user interface of the OTDR. The setup menu code includes sets of user setting code that provide for the inclusion and display of specific user settings through the setup menu, including a dynamic range setting. The sets of user setting code preferably also include event resolution setting code and test duration setting code. Each of these sets of user setting codes includes display code providing for the display of the user setting in the setup menu. Each user setting code also preferably includes input code and effect code that allow a user to input values into the settings and see the effect on other settings upon the introduction of input into one setting. Each user setting code also preferably includes lock code which allows the user to lock one of the user settings at a time. Each user setting code also preferably includes graphical control code providing for a presentation of the settings as ranges of values. Finally, each user setting also preferably includes locked limit code. This code is included in embodiments that also include graphical control code, and provides for the indication of any limits imposed on a setting by the locking in of a certain value or range of another setting. Such limits are preferably indicated directly on the limited setting.

It is understood that the sets of user setting code also include mode setting code providing a mode setting in the setup menu, wavelength setting code providing for a wavelength setting in the setup menu, and distance range setting code providing for a distance range setting in the setup menu. The mode setting provides a selection of user modes, including expert mode. The wavelength setting provides a selection of lasers available in the OTDR to measure a fiber network under test, or allows for input of a laser wavelength. The distance range setting provides a selection of lengths of a fiber network under test, or allows for input of a length.

In its most basic form, the method of the present invention includes the steps of providing a dynamic range, an event resolution, or a test duration input into an OTDR user interface, observing the effect of the input provision on the other parameters, analyzing the optimization of the three parameters, repeating these steps until an optimally balanced set of parameters is indicated for the purpose of the test, and analyzing the results of the test with that optimally balanced set of parameters. The method also preferably includes the step of locking a value or range into one of the settings.

Therefore it is an aspect of the present invention to provide an OTDR having an improved user interface that displays dynamic range.

It is a further aspect of the present invention to provide an OTDR having an improved user interface that allows a user to input dynamic range.

It is a further aspect of the present invention to provide an OTDR having an improved user interface that displays event resolution.

It is a further aspect of the present invention to provide an OTDR having an improved user interface that adjusts a display of dynamic range, event resolution, and test duration to correspond with inputs among the three.

It is a further aspect of the present invention to provide an OTDR having an improved user interface that allows one of the dynamic range, event resolution, and test duration parameters to be locked.

It is a further aspect of the present invention to provide an OTDR having an improved user interface that uses a graphical control to show ranges of parameters.

It is a further aspect of the present invention to provide an OTDR having an improved user interface that displays limits imposed on ranges of parameters when another parameter is locked.

It is a further aspect of the present invention to provide a software product capable of presenting the features of an OTDR having the improved user interface.

It is a further aspect of the present invention to provide a method for optimizing a test using an OTDR device with an OTDR having an improved user interface of the present invention.

These aspects of the present invention are not meant to be exclusive and other features, aspects, and advantages of the present invention will be readily apparent to those of ordinary skill in the art when read in conjunction with the following description, claims, and accompanying drawings.

BRIEF DESCRIPTION OF THE DRAWINGS

FIG. 2A is a depiction of typical prior art OTDR user settings in automatic mode.

FIG. 2B is a depiction of typical prior art OTDR user settings in expert mode.

DETAILED DESCRIPTION OF THE INVENTION

Figure 1:
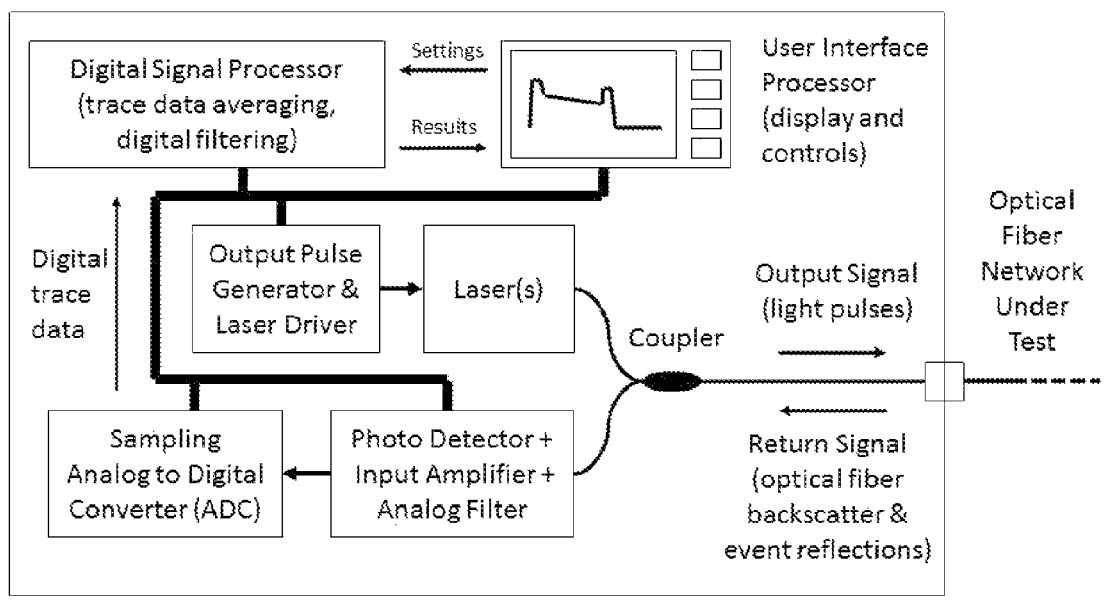
FIG. 1 is a block diagram showing the functional blocks of a typical prior art OTDR.
Figure 3A:
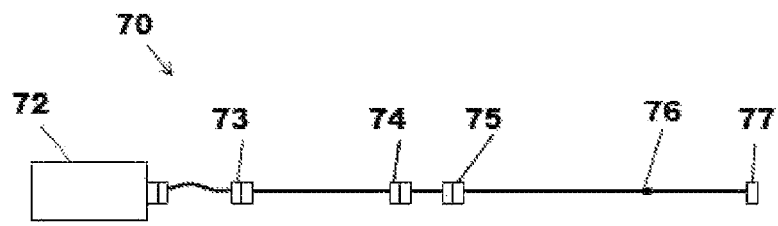
FIG. 3A is a diagram of an OTDR testing a fiber network.
Figure 3B:
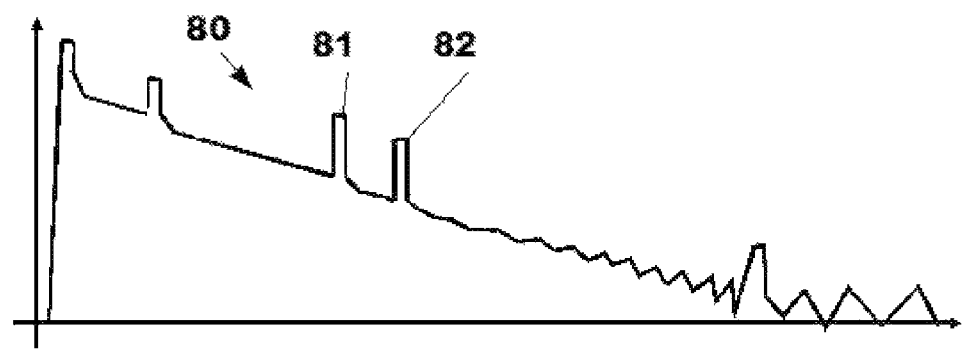
FIG. 3B is a graph showing a trace of the fiber network of FIG. 3A produced by the OTDR when a fine event resolution is chosen by the user.
Figure 3C:
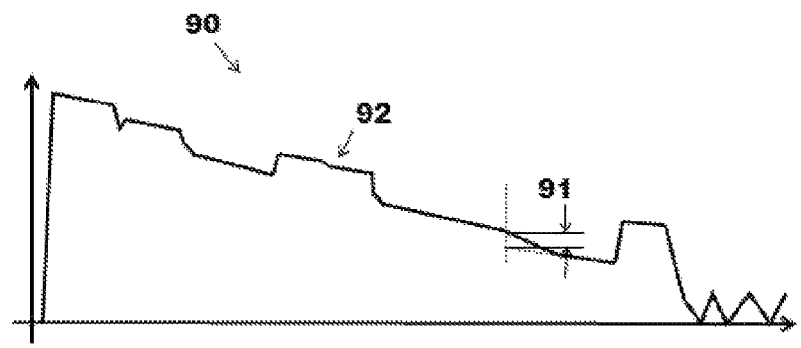
FIG. 3C is a graph showing a trace of the fiber network of FIG. 3A produced by the OTDR when a high dynamic range is chosen by the user.
Figure 4:
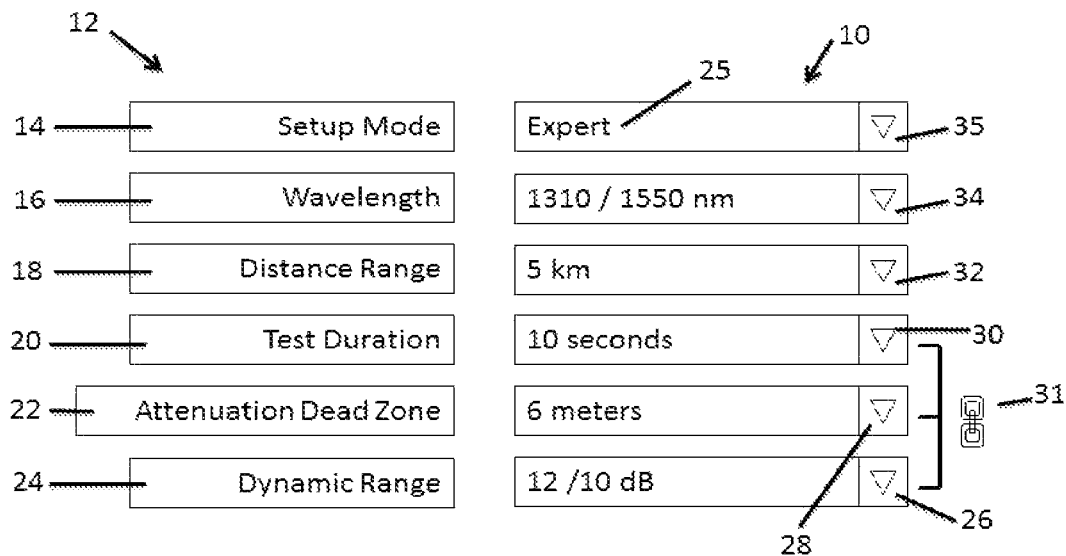
FIG. 4 is a depiction of OTDR user settings of the present invention.

Referring first to FIG. 4, one embodiment of the user interface 10 of the OTDR of the present invention is shown. OTDR user interface 10 includes setup menu 12, which includes setup mode setting 14, wavelength setting 16, distance range setting 18, test duration setting 20, event resolution setting 22, and dynamic range setting 24. In this embodiment, event resolution setting 22 is an attenuation dead zone setting. In other embodiments, event resolution setting 22 is a pulse width setting or other setting that correlates with event resolution. Each setting provides for data input, including mode input 35, wavelength input 34, distance range input 32, test duration input 30, event resolution input 28, and dynamic range input 26. Mode input 35 includes an option for expert mode 25. If one of test duration input 30, event resolution input 28, and dynamic range input 26 is provided, the other two will automatically adjust to show the user the effect of the input of the one on the other two. To graphically indicate this linkage, a 'chain' symbol and lines 31 are shown next to the test duration, event resolution, and dynamic range settings.

Figure 5A:
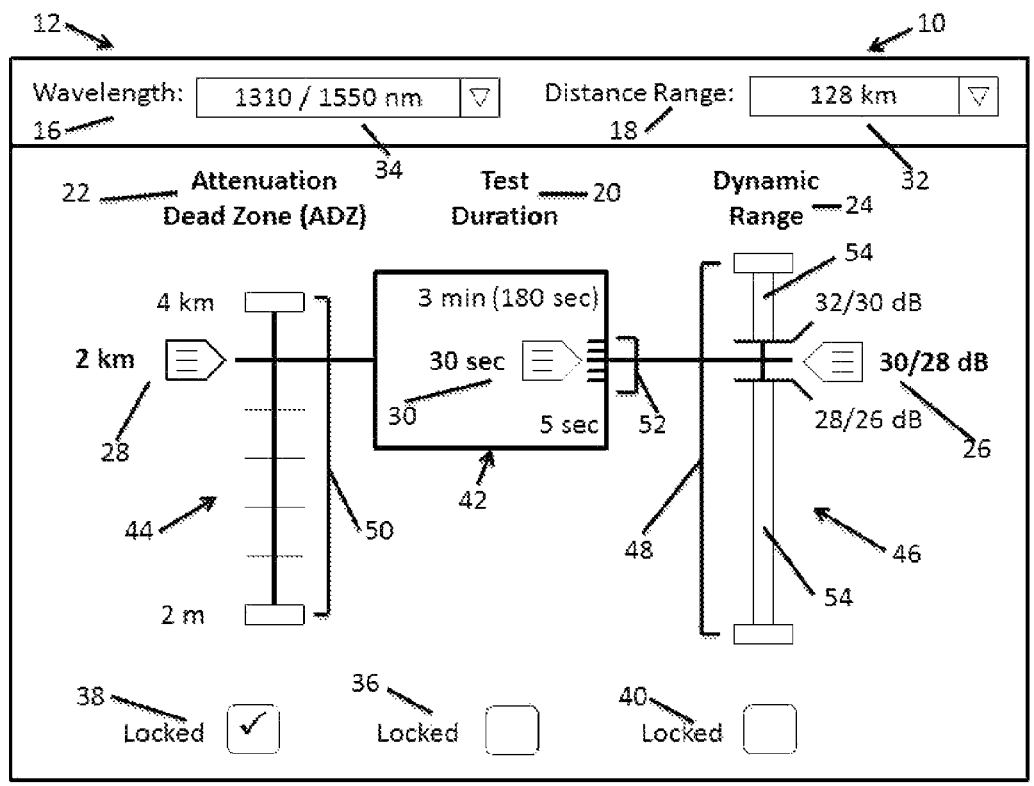
FIG. 5A is a depiction of an alternate embodiment of OTDR user settings of the present invention showing limits associated with locked parameters.

Now referring to FIG. 5A, another embodiment of the user interface 10 with setup menu 12 is shown. In this embodiment, test duration setting 20, event resolution setting 22, and dynamic range setting 24 are shown with graphical controls 26, 28, 30. Test duration graphical control 30, event resolution graphical control 28, and dynamic range graphical control 26 indicate a range of possible test durations, event resolutions, and dynamic ranges, respectively. The user may use the graphical controls 26, 28, 30 to move through test duration range 52, event resolution range 50, and/or dynamic range 48. As with the embodiment shown in FIG. 4, as one parameter is shifted, the others will shift to indicate the effect of the change of the first parameter on the other two.

Figure 5B:
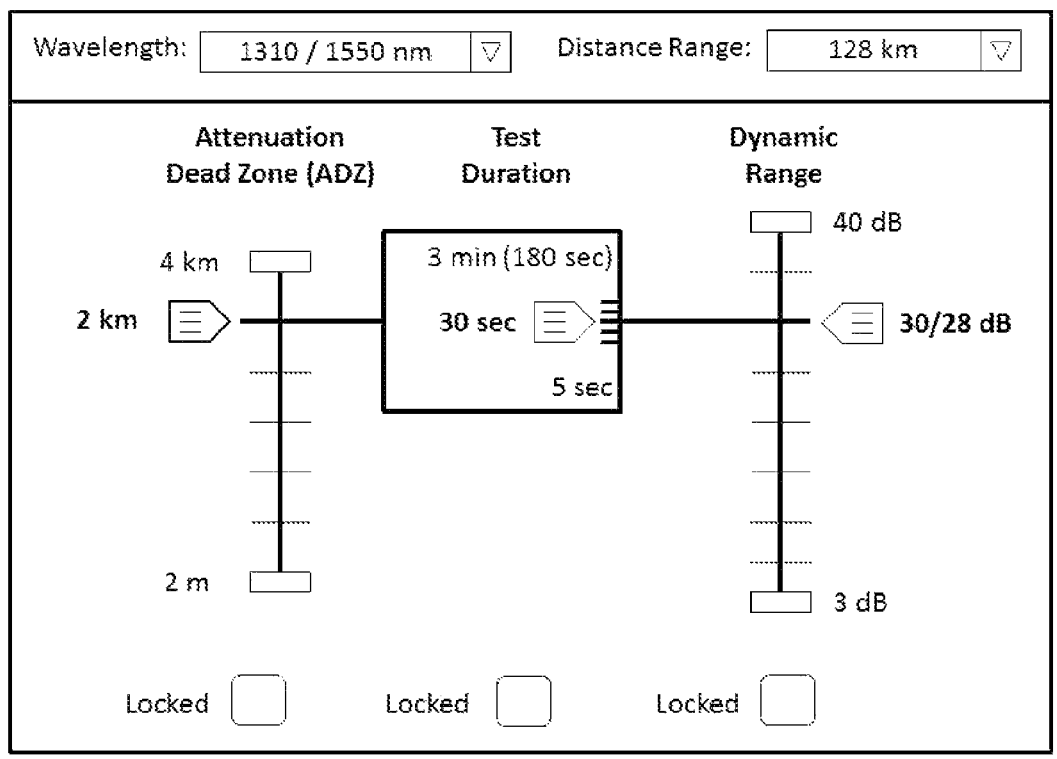
FIG. 5B is a depiction of the alternative embodiment of OTDR user settings of the present invention that does not show limits associated with locked parameters.

This embodiment of the user interface 10 also includes lock test duration setting 36, lock event resolution setting 38, and lock dynamic range setting 40. Only one of these lock settings 36, 38, 40 is selectable at a time, and its selection locks in the test duration, event resolution, or dynamic range chosen by the user. This allows the user to then make tradeoffs between the other two parameters while keeping the most important parameter for that particular test locked. In FIG. 5A, event resolution setting 22 has been locked. This embodiment also indicates any limits that are imposed on non-locked settings when another setting is locked. In this case, with event resolution setting 22 locked at 2 km, limit 54 is imposed on dynamic range setting 24, indicating to the user that the upper and lower limit of dynamic range setting 24 at 1310 and 1550 nm with a 2 km event resolution are 32/30 dB and 28/26 dB respectively. Limit 54 blocks off the remainder of the setting so that it is not possible to set the dynamic range setting 24 outside the allowed section when the event resolution setting 22 is locked at 2 km. FIG. 5B shows the same user interface 10, where no parameter has been locked so no limits are imposed.

It is noted that, although two embodiments of the user interface 10 have been shown in FIGS. 4, 5A, and 5B, there are a wide variety of ways in which the same data may be presented. For example, the data may be shown in the form of circular pie charts for the various parameters, in a series of graphs, or in any other manner known in the art of graphical display. Further, although there are no locks or limits shown in the embodiment of FIG. 4, it is also recognized that such locks and/or limits may be incorporated therein. Accordingly, the user interface 10 should not be seen as being so limited.

Figure 6:
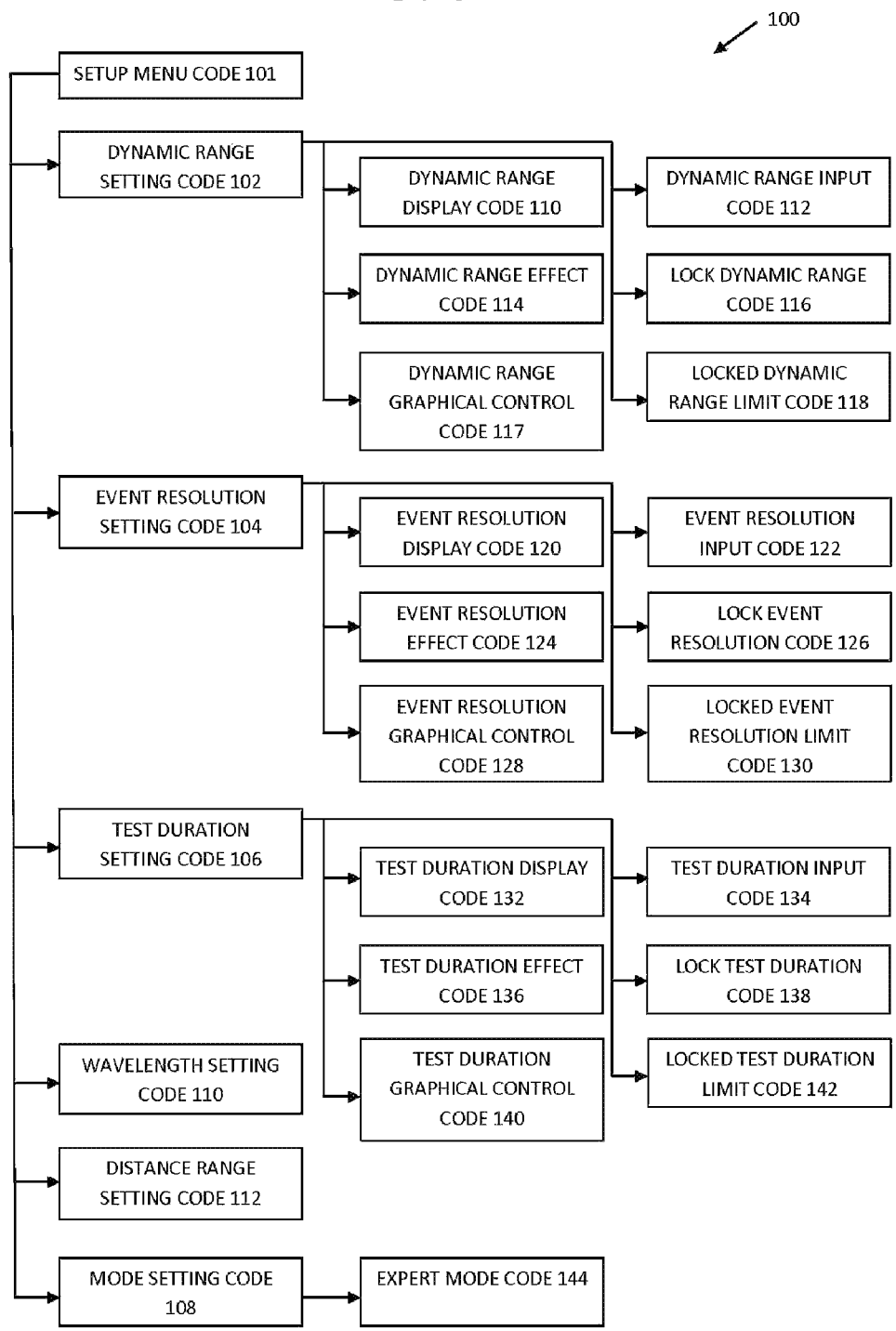
FIG. 6 is a block diagram showing the features of the software product of the present invention.

Now referring to FIG. 6, the features of OTDR software product 100 are shown. OTDR software product 100 includes setup menu code 101, which provides for a setup menu. Setup menu code 101 includes a plurality of sets of user setting code, including dynamic range setting code 102, event resolution setting code 104, test duration setting code 106, wavelength setting code 110, distance range setting code 112, and mode setting code 108. These plurality of sets of user setting code provide for a dynamic range setting, an event resolution setting, a test duration setting, a wavelength setting, a distance range setting, and a mode setting, respectively. Dynamic range setting code 102 includes dynamic range display code 110, dynamic range input code 112, dynamic range effect code 114, lock dynamic range code 116, dynamic range graphical control code 117, and locked dynamic range limit code 118. Event resolution setting code 104 includes event resolution display code 120, event resolution input code 122, event resolution effect code 124, lock event resolution code 126, event resolution graphical control code 128, and locked event resolution limit code 130. Test duration setting code 106 includes test duration display code 132, test duration input code 134, test duration effect code 136, lock test duration code 138, test duration graphical control code 140, and locked test duration limit code 142. Each display code 110, 120, 132 provides for the display of the user setting. Each input code 112, 122, 134 provides for the introduction of user input into each user setting. Each effect code 114, 124, 136 provides for the indication of the effect on the other user settings when one user setting receives input. Each lock code 116, 126, 138 provides the ability for the user to lock one of the user settings into a certain value or range at a time. Each graphical control code 117, 128, 140 provides for the user settings to be presented using graphical controls that display a range for each setting. Each locked limit code 118, 130, 142 provides for the indication of any limits imposed on a non-locked user setting by the locking of a certain value or range into another setting. Mode setting code 108 includes expert mode code 144 providing for an expert mode as a selection within the mode setting.

Figure 7:
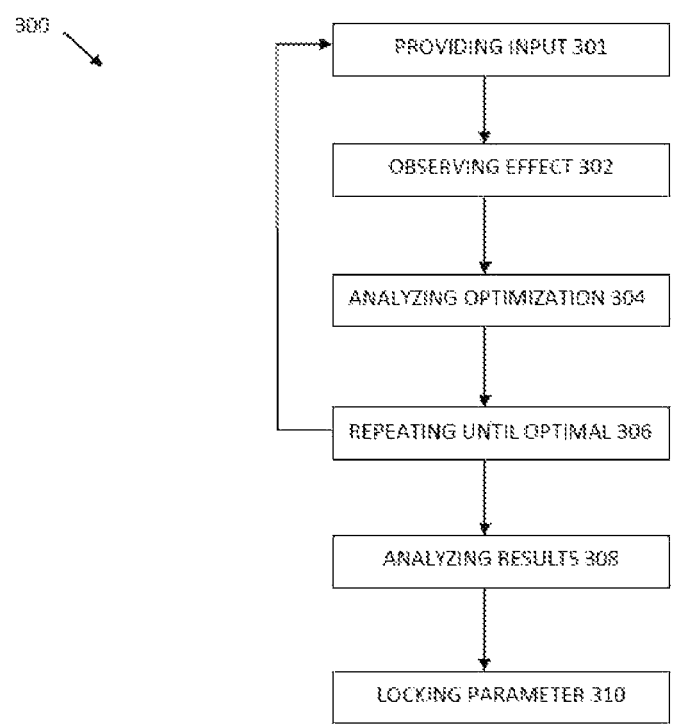
FIG. 7 is a flow chart showing the steps of the method of the present invention.

Now referring to FIG. 7, the steps of method 300 of the present invention are shown. Method 300 is for optimizing OTDR performance on an OTDR device that includes OTDR user interface 10 of the present invention. Method 300 includes the steps of providing one of the dynamic range input, the event resolution input, and the test duration input 301; observing the effect of the input provided on the other two parameters 302; analyzing the optimization of the three parameters 304; repeating the steps of providing an input, observing the effect, and analyzing the optimization until an optimal set of parameters is achieved 306; and analyzing the results of the test with the optimal set of parameters 308. Method 300 may also include the step of locking in a parameter 310 by selecting one of the lock dynamic range setting, the lock pulse width setting, and the lock test time setting.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. An Optical Time Domain Reflectometer (OTDR) comprising:
a user interface, said user interface comprising:
a setup menu comprising a plurality of user settings that display information corresponding to a different parameters of a test, said plurality of user settings comprising:
an event resolution setting that displays an event resolution of the test;
a test duration setting that displays a test duration of the test; and
a dynamic range setting that displays a dynamic range of the test, wherein:
said dynamic range setting that receives a quantitative dynamic range input from a user, wherein the quantitative dynamic range input is at least one numeric value with units in dB; and
a receipt of the quantitative dynamic range input affects at least one of the group consisting of the event resolution of the test displayed in said event resolution setting and the test duration of the test displayed in said test duration setting; and
wherein said dynamic range setting, said event resolution setting, and said test duration setting are displayed in said setup menu with a dynamic range graphical control that indicates a range of possible dynamic ranges of the test, an event resolution graphical control that indicates a range of possible event resolutions of the test, and a test duration graphical control that indicates a range of possible test durations of the test, respectively.

2. The OTDR as claimed in claim 1:
wherein said event resolution setting further receives an event resolution input from the user and wherein a receipt of the event resolution input affects the dynamic range of the test; and
wherein said test duration setting further receives a test duration input from the user and wherein a receipt of the test duration input affects the dynamic range of the test.

3. The OTDR as claimed in claim 2, wherein said setup menu further comprises a lock dynamic range setting, a lock event resolution setting, and a lock test duration setting, wherein only one of said lock dynamic range setting, said lock event resolution setting, and said lock test duration setting is selectable by the user at a time, and wherein a selection of said lock dynamic range setting locks a dynamic range into said dynamic range setting, a selection of said lock event resolution setting locks an event resolution into said event resolution setting, and a selection of said lock test duration setting locks a test duration into said test duration setting.

4. The OTDR as claimed in claim 2, wherein said event resolution setting is an attenuation dead zone setting that displays an attenuation dead zone of the test and receives an attenuation dead zone input from the user.

5. The OTDR as claimed in claim 3:
wherein when said lock dynamic range setting is selected, any limits imposed on said event resolution setting and said test duration setting by the dynamic range locked into said dynamic range setting by the selection are displayed on said event resolution graphical control and said test duration graphical control;
wherein when said lock event resolution setting is selected, any limits imposed on said dynamic range setting and said test duration setting by the event resolution locked into said event resolution setting by the selection are displayed on said dynamic range graphical control and said test duration graphical control; and
wherein when said lock test duration setting is selected, any limits imposed on said dynamic range setting and said event resolution setting by the test duration locked into said test duration setting by the selection are displayed on said dynamic range graphical control and said event resolution graphical control.

6. The OTDR as claimed in claim 1, wherein said setup menu further comprises:
a mode setting that allows a user to select a mode for operation of the device, wherein said mode setting comprises the option of an expert mode;
a wavelength setting that allows the user to select a laser to be used to measure a fiber network under test; and a distance range setting that allows the user to select a length of the fiber network under test to be included in an OTDR trace.

7. An Optical Time Domain Reflectometer (OTDR) user interface software product stored in the memory of an OTDR device and is executable by a control circuitry of the OTDR device, said OTDR user interface software product comprising:

setup menu code to include a setup menu in an OTDR user interface, wherein said setup menu code comprises:
a plurality of sets of user setting code to include a plurality of user settings that display information corresponding to different parameters of a test, wherein said plurality of sets of user setting code comprises:
event resolution setting code to include an event resolution setting in the setup menu, wherein said event resolution setting code comprises event resolution display code to display an event resolution of the test in the event resolution setting;
test duration setting code to include a test duration setting in the setup menu, wherein said test duration setting code comprises test duration display code to display a test duration of the test in the test duration setting; and
dynamic range setting code to include a dynamic range setting in the setup menu, wherein said dynamic range setting code comprises:
dynamic range display code to display a dynamic range of the test in the dynamic range setting;
dynamic range input code that allows an input of a quantitative dynamic range into the dynamic range setting, wherein the quantitative dynamic range input is at least one numeric value with units in dB; and
dynamic range effect code that adjusts the event resolution in the event resolution setting and the test duration in the test duration setting to correspond with the input dynamic range; and
wherein said dynamic range setting code further comprises dynamic range graphical control code that displays the dynamic range setting as a range of possible dynamic ranges;
wherein said event resolution setting code further comprises event resolution graphical control code that displays the event resolution setting as a range of possible event resolutions; and
wherein said test duration setting code further comprises test duration graphical control code that displays the test duration setting as a range of possible test durations.

8. The OTDR user interface software product as claimed in claim 7:
wherein said event resolution setting code further comprises:
event resolution input code that allows an input of an event resolution into the event resolution setting; and
event resolution effect code that adjusts the dynamic range in the dynamic range setting and the test duration in the test duration setting to correspond to the input event resolution; and
wherein said test duration setting code further comprises:

test duration input code that allows an input of a test duration into the test duration setting; and
test duration effect code that adjusts the dynamic range in the dynamic range setting and the event resolution in the event resolution setting to correspond to the input test duration.

9. The OTDR user interface software product as claimed in claim 8:
wherein said dynamic range setting code further comprises lock dynamic range setting code that locks a dynamic range into the dynamic range setting;
wherein said event resolution setting code further comprises lock event resolution setting code that locks an event resolution into the event resolution setting;
wherein said test duration setting code further comprises lock test duration setting code that locks a test duration into the test duration setting; and
wherein only one of said lock dynamic range setting code, said lock event resolution setting code, and said lock test duration setting code is executable at a time.

10. The OTDR user interface software product as claimed in claim 9:
wherein said dynamic range setting code further comprises locked dynamic range limit code that displays any limits imposed on the range of possible event resolutions in the event resolution setting and displays any limits imposed on the range of possible test durations in the test duration setting when said lock dynamic range setting code is executed;
wherein said event resolution setting code further comprises locked event resolution limit code that displays any limits imposed on the range of possible dynamic ranges in the dynamic range setting and displays any limits imposed on the range of possible test durations in the test duration setting when said lock event resolution setting code is executed; and
wherein said test duration setting code further comprises locked test duration limit code that displays any limits imposed on the range of possible dynamic ranges in the dynamic range setting and displays any limits imposed on the range of possible event resolutions in the event resolution setting when said lock test duration setting code is executed.

11. The OTDR user interface software product as claimed in claim 7, wherein said plurality of sets of user setting code further comprises:
mode setting code that displays information on a selection of modes available to a user for the test and allows the selection thereof, wherein said mode setting code comprises expert mode code providing for an expert mode as one of the selection of modes;
wavelength setting code that displays information on available lasers for the test; and
distance range setting code that displays information on a distance range for the test.

* * * * *